United States Patent
Murata et al.

(10) Patent No.: US 10,821,920 B2
(45) Date of Patent: Nov. 3, 2020

(54) WIRE HARNESS

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP); TOYOTA JIDOSHA KABUSHIKI KAISHA, Aichi (JP)

(72) Inventors: Takahiro Murata, Mie (JP); Hirokazu Komori, Mie (JP); Taiko Sato, Aichi (JP); Hiroyuki Ishikawa, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/647,255

(22) PCT Filed: Jun. 26, 2018

(86) PCT No.: PCT/JP2018/024137
§ 371 (c)(1),
(2) Date: Mar. 13, 2020

(87) PCT Pub. No.: WO2019/058687
PCT Pub. Date: Mar. 28, 2019

(65) Prior Publication Data
US 2020/0254945 A1    Aug. 13, 2020

(30) Foreign Application Priority Data
Sep. 20, 2017  (JP) .................................. 2017-180044

(51) Int. Cl.
  B60R 16/02    (2006.01)
  H02G 3/22     (2006.01)
  H01B 7/282    (2006.01)

(52) U.S. Cl.
  CPC ......... B60R 16/0215 (2013.01); H01B 7/282 (2013.01); H02G 3/22 (2013.01)

(58) Field of Classification Search
  CPC ...... H01B 7/282; H02G 3/22; B60R 16/0215; B60R 16/0222; B60R 16/0207
  See application file for complete search history.

(56) References Cited

U.S. PATENT DOCUMENTS 9,991,025 B1 *  6/2018  Yanazawa ............ H01B 7/0045
10,410,763 B2 *  9/2019  Itou ....................... H01B 7/0045
(Continued)

FOREIGN PATENT DOCUMENTS

JP    2009-152012    7/2009
JP    2011-65964     3/2011
(Continued)

OTHER PUBLICATIONS

International Search Report issued in International Patent Application No. PCT/JP2018/024137, dated Sep. 4, 2018, English translation.

(Continued)

*Primary Examiner* — Timothy J Thompson
*Assistant Examiner* — Amol H Patel
(74) *Attorney, Agent, or Firm* — Greenblum & Bernstein, P.L.C.

(57) ABSTRACT

A wire harness is disposed across an interior area and an exterior area, and is connected to a connection target component in the exterior area. The wire harness includes: a water shut-off cable being disposed across a boundary between the interior area and the exterior area, and having (Continued)

inter-wire water shut-off property; and a non-water shut-off cable being connected to the water shut-off cable in the exterior area, and being connectable to the connection target component.

7 Claims, 9 Drawing Sheets

(56) References Cited

U.S. PATENT DOCUMENTS

| | | | |
|---|---|---|---|
| 2011/0048762 A1 | 3/2011 | Sawamura | |
| 2015/0287497 A1* | 10/2015 | Shiga | H01B 7/2825 |
| | | | 174/84 R |
| 2016/0336097 A1* | 11/2016 | Sakagami | H02G 15/013 |
| 2017/0162299 A1* | 6/2017 | Komori | H01B 7/1805 |
| 2017/0349122 A1* | 12/2017 | Yanazawa | B60R 16/0215 |
| 2019/0131033 A1* | 5/2019 | Itou | H01R 4/72 |

FOREIGN PATENT DOCUMENTS

| | | |
|---|---|---|
| JP | 2012-182924 | 9/2012 |
| JP | 2016-10303 | 1/2016 |
| JP | 2016-213976 | 12/2016 |

OTHER PUBLICATIONS

International Preliminary Report on Patentability issued in International Patent Application No. PCT/JP2018/024137, dated Mar. 24, 2020, English translation.

* cited by examiner

F I G. 4
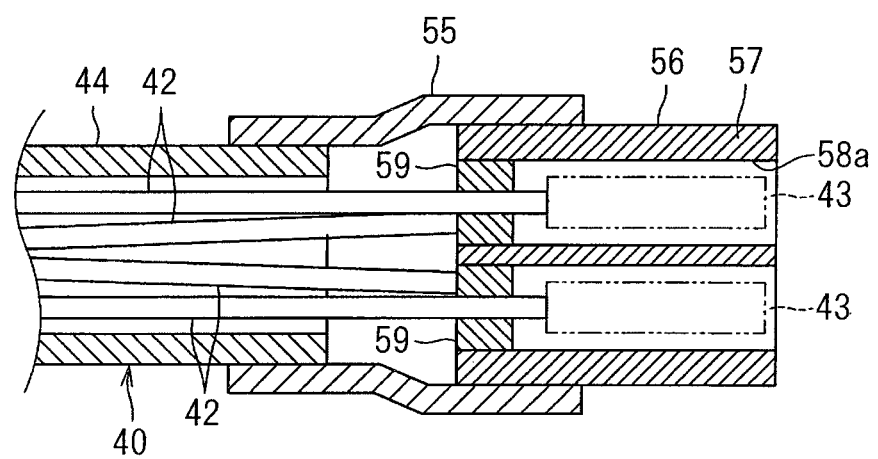

WIRE HARNESS

TECHNICAL FIELD

The present invention relates to a wire harness disposed across an interior area and an exterior area.

BACKGROUND ART

Patent Document 1 discloses a seal structure for a multicore cable including: a multicore cable in which a plurality of wires are surrounded by a sheath and the plurality of wires are led out through an end portion of the sheath; and a rubber plug including a sheath external fitting portion to be externally fitted to the end portion of the sheath, and a wire insertion part having a plurality of through holes through which the respective plurality of wires led out through the end portion of the sheath are inserted.

PRIOR ART DOCUMENTS

Patent Documents

Patent Document 1: Japanese Patent Application Laid-Open No. 2016-010303

SUMMARY

Problem to be Solved by the Invention

Incidentally, as illustrated in FIG. 9, there is a wire harness 500 disposed across an interior area E1 inside a vehicle body and an exterior area E2 outside the vehicle body. The wire harness 500 is disposed through a partition wall W between the interior area E1 and the exterior area E2. An end portion of the wire harness 500 disposed in the interior area E1 is connected to a connector 510, and the connector 510 is connected to an electrical device or the like in the interior area E1. An end portion of the wire harness 500 disposed in the exterior area E2 is connected to a connector 520, and the connector 520 is connected to an electrical device or the like in the exterior area E2.

In this case, a configuration that prevents water from entering the interior area E1 from the exterior area E2 through the inside of the wire harness 500 is required. To address the issues, as in the disclosure of Patent Document 1, a structure that an inter-wire seal structure is provided at an end portion of a cable, and covering the inter-wire seal structure and the connector 520 with a connector cover may be adopted.

However, the provision of an inter-wire seal structure at an end portion of a cable results in upsizing an end portion structure. If a space around a connection destination of the connector 500 in the exterior area E2 or a water shut-off space at a wire end portion is small, the provision of such an inter-wire seal structure may be difficult.

In view of this, the present invention has an object to prevent entrance of water from an exterior area into an interior area, and simultaneously downsize an end portion structure of a wire harness in the exterior area.

Means to Solve the Problem

To solve the problems described above, a first aspect is a wire harness being disposed across an interior area and an exterior area and being connected to a connection target component in the exterior area, the wire harness including: a water shut-off cable being disposed across a boundary between the interior area and the exterior area, and having inter-wire water shut-off property; and a non-water shut-off cable being connected to the water shut-off cable in the exterior area, and being connectable to the connection target component.

A second aspect is the wire harness according to the first aspect, in which the water shut-off cable includes a plurality of first wires, a sheath surrounding the plurality of first wires, and an inter-wire water shut-off unit configured to shut off water between the plurality of first wires, at an end portion of the sheath to be connected to the non-water shut-off cable, a first joint connector is provided at an end portion of the water shut-off cable to be connected to the non-water shut-off cable, the non-water shut-off cable includes a plurality of second wires collected together in a linear shape with gaps formed between end portions, and a second joint connector is provided at an end portion of the non-water shut-off cable to be connected to the water shut-off cable, and a connection destination connector is provided at an end portion of the non-water shut-off cable to be connected to the connection target component.

A third aspect is the wire harness according to the second aspect, in which in the connection destination connector, a connector water shut-off unit is provided, the connector water shut-off unit being configured to prevent water flowing along the plurality of second wires from entering the connection destination connector, at a portion where the plurality of second wires are led to the connection destination connector.

A fourth aspect is the wire harness according to any one of the first to third aspects, in which in an intermediate part of the water shut-off cable, a grommet to be disposed at a through hole formed in a panel dividing the interior area and the exterior area is attached.

A fifth aspect is the wire harness according to any one of the first to fourth aspects, in which the non-water shut-off cable includes a branch wire branching in an intermediate part of the plurality of second wires in an extending direction.

A sixth aspect is the wire harness according to any one of the first to fifth aspects, further including a third wire being electrically connected to a part of the plurality of second wires at a position of a connection destination connector of the non-water shut-off cable or at a position of the connection target component, and being extending from the connection destination connector to be connected to another connection target component in the exterior area.

A seventh aspect is the wire harness according to any one of the first to sixth aspects, in which the water shut-off cable includes a bendable part that can be disposed in a bent state in the exterior area.

Effects of the Invention

According to the first aspect, the non-water shut-off cable connectable to the connection target component need not be provided with a water shut-off structure. Therefore, an end portion structure of the wire harness in the exterior area can be downsized. Further, the non-water shut-off cable is connected to the water shut-off cable in the exterior area, and the water shut-off cable is led into the interior area across the boundary between the interior area and the exterior area. Therefore, the water shut-off cable prevents entrance of water from the exterior area into the interior area. According to this configuration, entrance of water from the exterior area into the interior area can be prevented, and an end portion structure of the wire harness in the exterior area can be downsized at the same time.

According to the second aspect, the non-water shut-off cable includes the plurality of second wires collected together in a linear shape with gaps formed between their end portions, and thus need not be provided with a water shut-off structure. Therefore, an end portion structure of the wire harness in the exterior area can be downsized. Further, the sheath and the inter-wire water shut-off unit can add inter-wire water shut-off property to the water shut-off cable.

According to the third aspect, the connector water shut-off unit can prevent entrance of water into the connection destination connector.

According to the fourth aspect, the grommet blocks water that flows along an outer circumferential portion of the water shut-off cable. Therefore, entrance of water into the interior area is prevented.

In the non-water shut-off cable, an inter-wire water shut-off structure can be omitted. Therefore, as in the fifth aspect, the non-water shut-off cable can easily achieve a structure including the branch wire that branches in an intermediate part of the plurality of second wires in the extending direction.

According to the sixth aspect, a part of the second wires can be caused to branch as the third wire so as to be connected to another connection target component, without causing a branch in an intermediate part of the non-water shut-off cable.

According to the seventh aspect, when the water shut-off cable is bent, the configuration can be compatible with various layouts, and can adjust excess length.

BRIEF DESCRIPTION OF DRAWINGS

FIG. 4 is a schematic cross-sectional view illustrating a modification of the end portion of the non-water shut-off cable.

DESCRIPTION OF EMBODIMENTS

Figure 1:
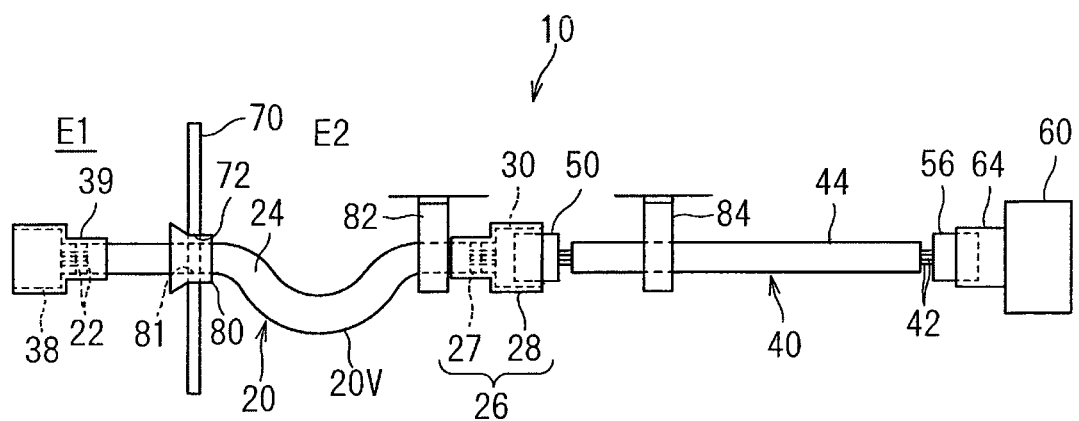
FIG. 1 is a schematic diagram illustrating an overall configuration of a wire harness according to an embodiment.

A wire harness according to an embodiment will be described below. FIG. 1 is a schematic diagram illustrating an overall configuration of a wire harness.

The wire harness 10 is disposed across an interior area E1 and an exterior area E2, and is connected to a connection target component in the exterior area E2.

For example, the interior area E1 is an area inside a vehicle body or the like, and is an area protected from exposure to outside water by the vehicle body or the like.

For example, the exterior area E2 is an area outside the vehicle body, such as an engine room, and is an area that may be exposed to outside water. In the exterior area E2, a connection target component 60 having a water shut-off structure, such as an electronic control unit, a sensor, and a drive source (e.g., a motor), is disposed.

A panel 70, being a part of the vehicle body, for example, is provided between the interior area E1 and the exterior area E2, and the panel 70 divides the interior area E1 and the exterior area E2. In the panel 70, a through hole 72 for allowing the wire harness 10 to pass is formed.

The wire harness 10 includes a water shut-off cable 20 and a non-water shut-off cable 40.

The water shut-off cable 20 is a cable having inter-wire water shut-off property, which is disposed across the boundary between the interior area E1 and the exterior area E2. The cable having inter-wire water shut-off property herein refers to a cable having a water shut-off structure that prevents entrance of water between a plurality of first wires 22 included in the water shut-off cable 20.

In the interior area E1, one end portion of the water shut-off cable 20 is connected to an electrical component or another wire harness, for example, that is disposed in the interior area E1. The water shut-off cable 20 is guided from the interior area E1 to the exterior area E2, through the through hole 72 formed in the panel 70. Another end portion of the water shut-off cable 20 is disposed in the exterior area E2.

The non-water shut-off cable 40 is a cable that is connected to the water shut-off cable 20 in the exterior area E2, and that is connected to the connection target component 60 disposed in the exterior area E2. The non-water shut-off cable 40 herein refers to a cable not having a water shut-off structure that prevents entrance of water between a plurality of second wires included in the non-water shut-off cable 40. Alternatively, if the non-water shut-off cable 40 has a water shut-off structure of a certain degree, the non-water shut-off cable 40 herein refers to a cable having the water shut-off structure simplified or downsized as compared to the water shut-off structure of the water shut-off cable 20, and having a water entrance prevention effect for a gap between the first wires 22 lower than the water entrance prevention effect of the water shut-off structure of the water shut-off cable 20.

In the exterior area E2, one end portion of the non-water shut-off cable 40 is connected to the above another end portion of the water shut-off cable 20. Another end portion of the non-water shut-off cable 40 is connected to the connection target component 60 disposed in the exterior area E2.

Therefore, the connection target component 60 disposed in the exterior area E2 is connected to the above electrical component or the above another wire harness disposed in the interior area E1, through the wire harness 10 including the water shut-off cable 20 and the non-water shut-off cable 40.

In the exterior area E2, the non-water shut-off cable 40 may be exposed to water, and thus water may enter between second wires 42 of the non-water shut-off cable 40. However, the water entering between the second wires 42 of the non-water shut-off cable 40 is discharged to the outside in the exterior area E2.

Further, in the exterior area E2, the water shut-off cable 20 may be exposed to water. However, since the water shut-off cable 20 is a cable having inter-wire water shut-off property, entrance of water between the first wires 22 is prevented.

Further, the water shut-off cable 20 passes through the through hole 72 of the panel 70 to be led into the interior area E1. This configuration prevents water from flowing along a gap between the first wires 22 of the water shut-off cable 20 to enter the interior area E1.

Further, in the non-water shut-off cable 40, the water shut-off structure is omitted, or simplified or downsized, and thus an end portion structure thereof is downsized. Therefore, the disposition area for the water shut-off cable 20 can be sufficiently secured, even when the area inside the exterior area E2, in particular the disposition area near the connection target component 60, is small.

Figure 2:
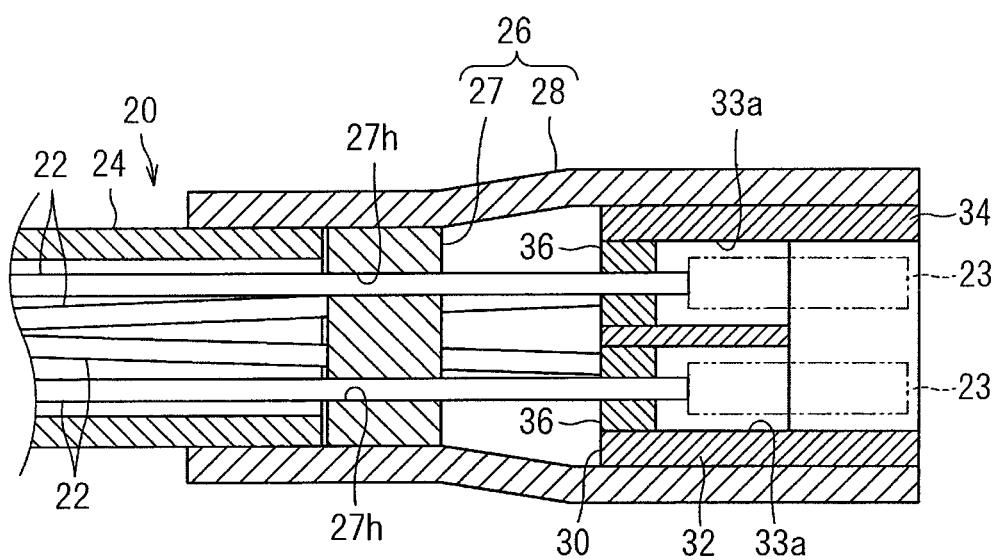
FIG. 2 is a schematic cross-sectional view illustrating an end portion of a water shut-off cable.

FIG. 2 is a schematic cross-sectional view illustrating an end portion of the water shut-off cable 20. As illustrated in FIG. 1 and FIG. 2, the water shut-off cable 20 includes a plurality of first wires 22, a sheath 24, and an inter-wire water shut-off unit 26.

The first wire 22 includes a core wire, and coating that surrounds the core wire. The core wire is a linear member made of copper, a copper alloy, aluminum, or an aluminum alloy, for example. The coating is insulation coating formed by extruding resin to surround and coat the core wire, for example. The plurality of first wires 22 are bundled into a linear shape. The plurality of first wires 22 are any one of a signal wire, a power wire, and a ground wire. The plurality of first wires 22 may have the same outer diameter, or may have different outer diameters.

The sheath 24 is a tubular member that surrounds the plurality of first wires 22. The sheath 24 is formed by extruding resin to surround and coat the plurality of first wires 22, for example. End portions of the plurality of first wires 22 extend from both end portions of the sheath 24.

The inter-wire water shut-off unit 26 is configured to shut off water between the plurality of first wires 22, at an end portion of the sheath 24 to be connected to the non-water shut-off cable 40.

More specifically, the inter-wire water shut-off unit 26 includes a plug member 27 and a cover 28.

The plug member 27 is formed to be a member of a columnar shape (here, a cylindrical shape) made of an elastic member such as rubber. In the plug member 27, a plurality of through holes 27*h* extending from its one end portion to another end portion are formed. The plurality of through holes 27*h* are formed corresponding to the plurality of first wires 22, and are formed to have an inner diameter having the same or smaller (only slightly smaller) dimension as the outer diameter of corresponding first wires 22. The plurality of first wires 22 are inserted into the corresponding through holes 27*h*. In this manner, a gap between the plurality of first wires 22 is sealed by the plug member 27. The plug member 27 is disposed as close as possible to an opening rim portion of the sheath 24.

The cover 28 is a tubular member made of an elastic member such as rubber, and is disposed to surround an outer circumferential portion of an end portion of the sheath 24 and an outer circumferential portion of the plug member 27. The cover 28 is attached to the outer circumferential portion of the end portion of the sheath 24 and the outer circumferential portion of the plug member 27 as tightly as possible so as to prevent entrance of water. The cover 28 prevents entrance of water that may enter through a portion between the opening rim portion of the sheath 24 and the plug member 27.

When the plug member 27 shuts off water between the plurality of first wires 22, and the cover 28 shuts off water between the opening rim portion of the sheath 24 and the plug member 27, entrance of water into the water shut-off cable 20 is prevented.

A first joint connector 30 is provided at an end portion of the water shut-off cable 20 to be connected to the non-water shut-off cable 40. The first joint connector 30 is a connector for connecting the water shut-off cable 20 to the non-water shut-off cable 40. Here, the first joint connector 30 includes a connector housing 32 and a connector water shut-off plug 36.

The connector housing 32 is a member made of resin, for example. In the connector housing 32, a plurality of cavities 33*a* for accommodating terminals 23 connected to respective end portions of the plurality of first wires 22 are formed. Further, a connector hood 34 is formed on the front side of the connector housing 32. When the terminals 23 are inserted and disposed in respective cavities 33*a*, the terminals 23 are held with their tip end portions projecting in the connector hood 34.

The connector water shut-off plug 36 is an annular member made of an elastic member such as rubber, and is externally fitted to each end portion of the plurality of first wires 22. In a state in which the terminals 23 are held in the cavities 33*a*, the connector water shut-off plug 36 is fitted into a rear end portion of the cavities 33*a*. This configuration prevents entrance of water into the connector housing 32 from a side of the first joint connector 30 from which the first wires 22 extend.

The cover 28 also extends from the plug member 27 toward the connector housing 32, and surrounds the connector housing 32. This configuration also prevents entrance of water between the connector housing 32 and the plug member 27. The cover 28 may be bent between the plug member 27 and the connector housing 32. The configuration that the cover 28 surrounds the connector housing 32 is not a requirement.

Note that, here, an inner connector 38 is provided at one end portion of the water shut-off cable 20. The configuration of the inner connector 38 itself can be a configuration similar to that of the first joint connector 30. Further, an inter-wire water shut-off unit 39 having a configuration similar to that of the inter-wire water shut-off unit 26 is provided at one end portion of the water shut-off cable 20. Note that the inter-wire water shut-off unit 39 may be omitted at one end portion of the water shut-off cable 20.

Figure 3:
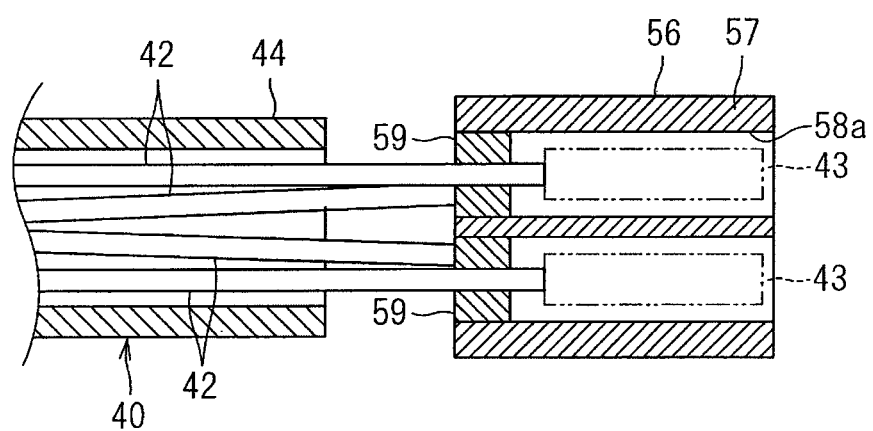
FIG. 3 is a schematic cross-sectional view illustrating an end portion of a non-water shut-off cable.

FIG. 3 is a schematic cross-sectional view illustrating an end portion of the non-water shut-off cable 40. As illustrated in FIG. 1 and FIG. 3, the non-water shut-off cable 40 includes a plurality of second wires 42 that are collected together in a linear shape with gaps formed between their end portions.

In a similar manner to the first wire 22, the second wire 42 includes a core wire, and coating that surrounds the core wire. In a similar manner to the plurality of first wires 22, the plurality of second wires 42 are any one of a signal wire, a power wire, and a ground wire. The plurality of second wires 42 may have the same outer diameter, or may have different outer diameters.

Protective coating 44 is provided around the plurality of second wires 42, in order to maintain the plurality of second wires 42 in the linearly collected state, and protect the plurality of second wires 42 from the outside.

Examples of the protective coating 44 may include a corrugated tube attached around the plurality of second wires 42; a member formed by extruding resin to surround and coat the plurality of second wires 42, for example, as with the case of the sheath 24; an adhesive tape wound around the plurality of second wires 42; and a resin sheet. The protective coating 44 may be omitted.

End portions of the plurality of second wires 42 extend from both end portions of the protective coating 44.

Unlike the water shut-off cable 20, an inter-wire water shut-off unit is not provided at an end portion of the protective coating 44. Therefore, at both end portions of the non-water shut-off cable 40, there is a gap where no solid bodies are interposed between the plurality of second wires 42, which may allow water to enter between the plurality of second wires 42. Since an inter-wire water shut-off unit is not provided at both the end portions of the water shut-off cable 20, the structure is more simplified and downsized for the absence of the plug member 27, in comparison with the structure in which the inter-wire water shut-off unit 26 is provided.

A second joint connector 50 is provided at an end portion of the non-water shut-off cable 40 to be connected to the water shut-off cable 20, and a connection destination connector 56 is provided at an end portion of the non-water shut-off cable 40 to be connected to the connection target component 60.

The connection destination connector 56 is a connector for connecting the non-water shut-off cable 40 to the connection target component 60, and is configured to be connectable to a receiver connector 64 provided in the connection target component 60. Here, the connection destination connector 56 includes a connector housing 57 and a connector water shut-off plug 59.

The connector housing 57 is a member made of resin, for example. In the connector housing 57, a plurality of cavities 58a for accommodating terminals 43 connected to respective end portions of the plurality of second wires 42 are formed. A tip end portion of the connector housing 57 is configured to be insertable into and connectable to a receiving recess portion formed in the receiver connector 64. Preferably, in a state in which the connector housing 57 is inserted into and connected to the receiver connector 64, a seal member for preventing entrance of water between those components is provided. When the terminals 43 are inserted and disposed in the cavities 58a, the terminals 43 are held at certain positions in the connector housing 57. In a state in which the connector housing 57 is inserted into and connected to the receiver connector 64, the terminals 43 are connected to corresponding terminals in the receiver connector 64. If the terminals 43 are female terminals including a tubular portion, the terminals provided in the receiver connector 64 are male terminals including a tab or pin-like insertion connection portion. The inserting and inserted relationship (recess and projection relationship) between the connection destination connector 56 and the receiver connector 64, and the male/female relationship between the terminals 43 and the terminals of the receiver connector 64 may be the opposite.

The connector water shut-off plug 59 is an annular member made of an elastic member such as rubber, and is externally fitted to each end portion of the plurality of second wires 42. In a state in which the terminals 43 are held in the cavities 58a, the connector water shut-off plug 59 is fitted into a rear end portion of the cavities 58a. This configuration prevents entrance of water into the connector housing 57 from a side of the connection destination connector 56 from which the second wires 42 extend. In other words, the connector water shut-off plug 59 is a connector water shut-off unit that prevents water flowing along the second wires 42 from entering the connection destination connector 56, at a portion where the second wires 42 are led to the connection destination connector 56.

Note that, as illustrated in FIG. 4, a cover 55 that surrounds a part from an outer circumferential portion of an end portion of the protective coating 44 to an outer circumferential portion of the connector housing 57 may be provided. The cover 55 is a tubular member made of an elastic member such as rubber. This configuration also prevents entrance of water between the connector housing 57 and the protective coating 44. The cover 55 may be bent between the connector housing 57 and the protective coating 44.

Also with the configuration in which the cover 55 is provided as described above, the water shut-off structure can be simplified and downsized for the absence of the plug member 27, in comparison with the configuration in which the plug member 27 that implements the inter-wire water shut-off is provided.

The second joint connector 50 is a connector for connecting the non-water shut-off cable 40 to the water shut-off cable 20, and is configured to be connectable to the first joint connector 30.

The second joint connector 50 can adopt a configuration including a connector housing and a connector water shut-off plug, in a similar manner to the connection destination connector 56.

If the area near the connection target component 60 is small, and a relatively large space can be secured near the first joint connector 30 of the water shut-off cable 20, for example, the second joint connector 50 may be provided with an inter-wire water shut-off unit similar to the inter-wire water shut-off unit 39. The configuration that an inter-wire water shut-off unit is provided at one end portion of the cable and an inter-wire water shut-off unit is not provided at another end portion is also one type of a non-water shut-off cable.

Further, a grommet 80 is attached to an intermediate part of the water shut-off cable 20 in an extending direction. The grommet 80 is made of an elastic member such as rubber, and is formed into an annular shape that can be fitted into the through hole 72 formed in the panel 70. In the grommet 80, a through hole 81 extending through both its ends is formed, and the water shut-off cable 20 can be inserted and disposed through the through hole 81.

When the water shut-off cable 20 is inserted into the through hole 27h, and then the grommet 80 attached to the water shut-off cable 20 is fitted into the through hole 72, a gap between an outer circumferential portion of the water shut-off cable 20 and an inner circumferential portion of the through hole 72 are blocked by the grommet 80. Owing to this configuration, water in the exterior area E2 is prevented from flowing along the outer circumferential portion of the water shut-off cable 20 to enter the interior area E1. Further, the water shut-off cable 20 is held at a certain position with respect to the panel 70 through the grommet 80.

For example, the wire harness 10 is assembled to a vehicle or the like being an assembly target as follows:

Specifically, a bracket 82 is attached to a part of the water shut-off cable 20 on the first joint connector 30 side, and a bracket 84 is attached to a part of the non-water shut-off cable 40 on the second joint connector 50 side. Each of the brackets 82 and 84 is a member made of a metal sheet or resin, for example, and is fixed to the water shut-off cable 20 or the non-water shut-off cable 40 by crimping fixing, screw fixing, or winding fixing, for example. The brackets 82 and 84 are fixed to the vehicle body or the like by screwing, a fitting structure, or welding, for example, and positions supported by the brackets 82 and 84 in the wire harness 10 are supported at certain positions.

Further, when the grommet 80 attached to the water shut-off cable 20 is fitted into the through hole 72, the attachment position of the grommet 80 in the water shut-off cable 20 is supported at a certain position with respect to the panel 70.

Further, when the connection destination connector 56 is connected to the receiver connector 64 of the connection target component 60, the end portion of the non-water shut-off cable 40 on the connection target component 60 side is supported at a certain position.

In the assembled state of the wire harness 10, as an example, the water shut-off cable 20 is disposed in a bent state in the exterior area E2. In the example illustrated in FIG. 1, a part of the water shut-off cable 20 between a position supported by the grommet 80 and a position supported by the bracket 82 sags and curves in an arc-shaped, as a bendable part 20V. The water shut-off cable 20 itself has a configuration in which the sheath 24 made of resin is formed to surround a plurality of bendable and deformable first wires 22, which allows the water shut-off cable 20 to be disposed in a bent state as described above.

Figure 5:
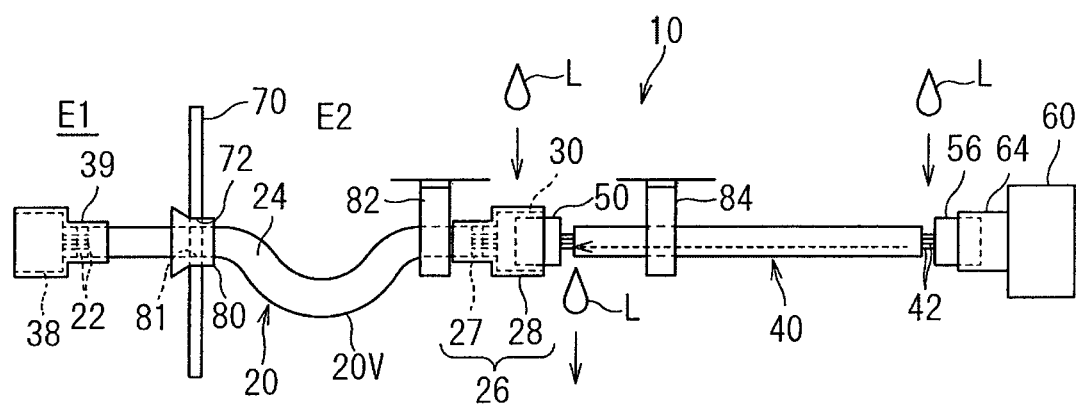
FIG. 5 is an explanatory diagram illustrating a state in which the wire harness is exposed to water in an exterior area.

FIG. 5 is an explanatory diagram illustrating a state in which the wire harness 10 is exposed to water in the exterior area E2. As illustrated in the figure, a part of the non-water shut-off cable 40 close to the connection destination connector 56 is exposed to water L. In this case, the connection destination connector 56 is provided with the connector water shut-off plug 59, and therefore entrance of water into the connection destination connector 56 etc. is prevented. Further, water may enter between the second wires 42 of the non-water shut-off cable 40. Even if water flows along the second wires 42 and enters the protective coating 44, the water L is discharged to the outside through either end portion of the protective coating 44. Therefore, the water entering the non-water shut-off cable 40 does not flow into the water shut-off cable 20. Here, for the sake of easier discharge of the water L, one end of the non-water shut-off cable 40 may be disposed at a higher position or a lower position than another end so as to guide the water L.

Further, the water shut-off cable 20 itself has inter-wire water shut-off property owing to the inter-wire water shut-off unit 39, and therefore entrance of water between the plurality of second wires 42 is prevented. Therefore, even if the water shut-off cable 20 is exposed to water L in the exterior area E2, entrance of the water into the interior area E1 along the water shut-off cable 20 is prevented. Further, owing to the grommet 80, entrance of water flowing along the outer circumferential portion of the water shut-off cable 20 is also prevented.

According to the wire harness 10 having the configuration as described above, the non-water shut-off cable 40 connected to the connection target component 60 need not be provided with a water shut-off structure. Therefore, an end portion structure of the wire harness 10 in the exterior area E2 can be downsized. Further, the non-water shut-off cable 40 is connected to the water shut-off cable 20 in the exterior area E2, and the water shut-off cable 20 is led into the interior area E1 across the boundary between the interior area E1 and, the exterior area E2. Therefore, the water shut-off cable 20 prevents entrance of water from the exterior area E2 into the interior area E1. According to this configuration, entrance of water from the exterior area E2 into the interior area E1 can be prevented, and an end portion structure of the wire harness 10 in the exterior area E2 can be downsized at the same time.

Further, the non-water shut-off cable 40 includes the plurality of second wires 42 collected together in a linear shape with gaps formed between their end portions, and thus need not be provided with a water shut-off structure. Therefore, an end portion structure of the wire harness 10 in the exterior area E2 can be downsized. Further, the sheath 24 and the inter-wire water shut-off unit 39 add inter-wire water shut-off property to the water shut-off cable 20. In this manner, entrance of water into the interior area E1 can be prevented.

Further, the connection destination connector 56 is provided with the connector water shut-off plug 59, and therefore the connector water shut-off plug 59 can prevent entrance of water into the connection destination connector 56.

Further, the grommet 80 is attached to the water shut-off cable 20, and thus the grommet 80 blocks water that flows along the outer circumferential portion of the water shut-off cable 20. In this manner, entrance of water into the interior area E1 is prevented.

Further, the water shut-off cable 20 is bent in the exterior area E2, and thus the configuration can be compatible with various layouts such as the position of the through hole 27h, the position of the connection target component 60, and a space between those, or can adjust excess length of the wire harness 10 between the through hole 27h and the connection target component 60. Further, water is less liable to remain inside a part of the water shut-off cable 20 disposed in a bent state in the exterior area E2. Further, instead of being in a bent state in an assembled state of the wire harness 10, the water shut-off cable 20 may be disposed in a part that bends according to the movement of a movable part, such as suspension arms, when the vehicle runs. Also when the water shut-off cable 20 bends in the bending part, water is less liable to remain inside the water shut-off cable 20.

In the wire harness 10, the non-water shut-off cable 40 is used in a part close to the connection target component 60, and thus the protective coating 44 can be omitted. Alternatively, even when the non-water shut-off cable 40 is protected, a corrugated tube, a wound adhesive tape, or the like may be used as the protective coating, instead of the sheath 24 having high sealing property as used in the water shut-off cable 20. This configuration makes another wire easily branch in an intermediate part of the non-water shut-off cable 40.

Figure 6:
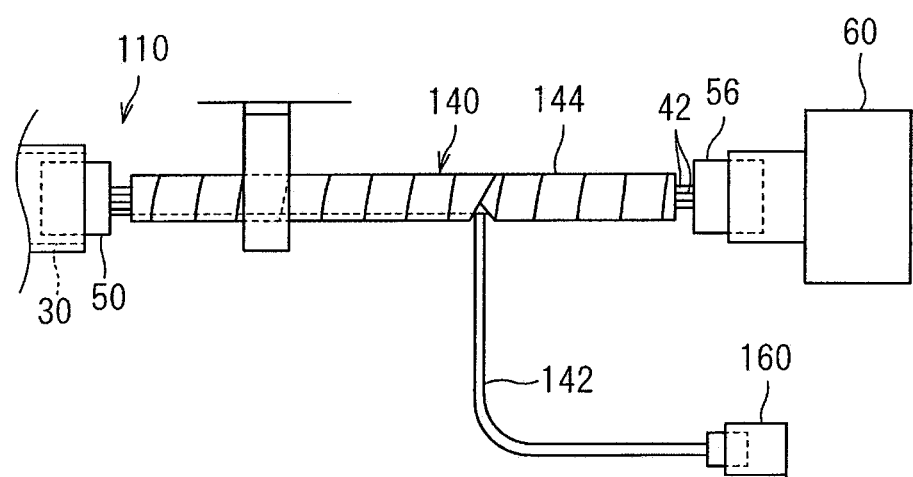
FIG. 6 is a schematic diagram illustrating a wire harness according to a modification.

Modifications in view of the above will be described. FIG. 6 is a schematic diagram illustrating a wire harness 110 according to a modification. In the wire harness 110, a non-water shut-off cable 140 being an equivalent of the non-water shut-off cable 40 includes a branch wire 142 that branches in an intermediate part of the plurality of second wires 42 in an extending direction.

More specifically, in a state in which the plurality of second wires 42 are collected together in a linear shape, protective coating 144 is formed by an adhesive tape wound around an outer circumferential portion of the plurality of second wires 42. At least one branch wire 142 branches in an intermediate part of the plurality of second wires 42 in the extending direction. The branch wire 142 is connected to one of the first wires 22 of the water shut-off cable 20 through the second joint connector 50. The protective coating 144 is wound around the the plurality of second wires 42, except the part where the branch wire 142 branches from the plurality of second wires 42.

A tip end portion of the branch wire 142 is connected to another connection target component 160. The branch wire 142 and the connection target component 160 may be connected with a connector, a direct connection target component 160, such as a sensor, may be connected to an end portion of the branch wire 142, or the direct connection target component 160 may be integrally provided.

Also when the plurality of connection target components 60 and 160 exist in the exterior area E2 as described above, an inter-wire water shut-off structure can be omitted in the non-water shut-off cable 140. Therefore, a structure including the branch wire 142 that branches in an intermediate part of the plurality of second wires 42 can be easily achieved. Further, as the second wires 42 connected to the connection destination connector 56, second wires 42 only necessary for the connection to the connection target component 60 can be used. Therefore, the connection destination connector 56 can be downsized. For example, this configuration does not require a short-circuit bus bar 244 as in modifications to be described later, and accordingly the connection destination connector 56 can be downsized. Further, the branch wire 142 can be connected to another connection target component 160 on an optimal route, and thus the wire length of the branch wire 142 can be reduced.

The above example describes an example in which the protective coating 144 is formed by winding an adhesive tape around the second wires 42. However, as another method, a corrugated tube with a slit may be attached to the second wires 42, and the branch wire 142 may be led out through the slit. Further, different corrugated tubes may be attached to parts in front of and behind the branch position of the branch wire 142 in the second wires 42. Further, the non-water shut-off cable 140 may adopt a cable with a sheath formed by extrusion coating or the like and from which the sheath is stripped in a part up to the branch position of the branch wire 142. In this case, the part from which the sheath is stripped may be left as it is, may be covered by another corrugated tube, or may be wound around with an adhesive tape.

Further, since high water shut-off property is not required in an outer circumferential portion of the second wires 42 extending from the connection destination connector 56, the configuration is also appropriate for leading a wire extending from the connection destination connector 56, separately from the second wires 42.

Figure 7:
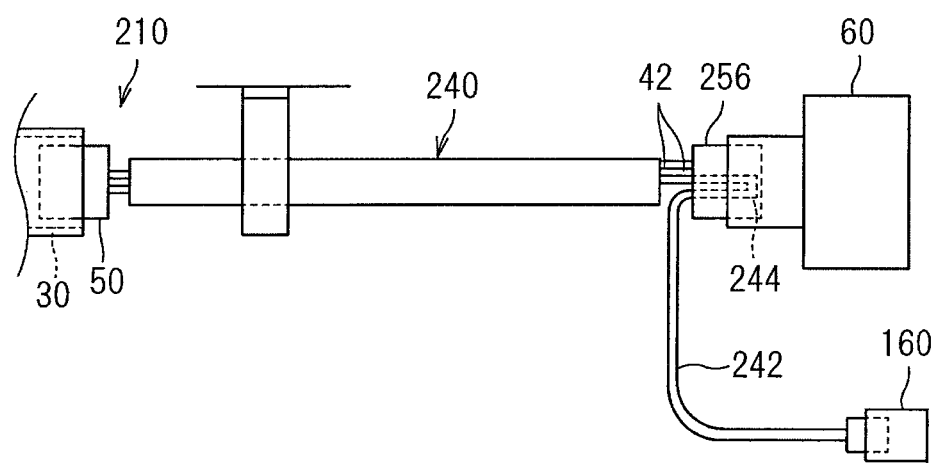
FIG. 7 is a schematic diagram illustrating a wire harness according to another modification.

Modifications in view of the above will be described. FIG. 7 is a schematic diagram illustrating a wire harness 210 according to a modification. In the wire harness 210, a non-water shut-off cable 240 further includes a third wire 242 that is electrically connected to a part of the plurality of second wires 42 in a connection destination connector 256 being an equivalent of the connection destination connector 56, and that extends from the connection destination connector 256 to be connected to another connection target component 160 disposed in the exterior area E2.

Specifically, the plurality of second wires 42 are led into the connection destination connector 256. One end portion of at least one third wire 242 is also disposed in the connection destination connector 256. A part of the plurality of second wires 42 is connected to the third wire 242 in the connection destination connector 256. The rest of the plurality of second wires 42 is connected to an electrical circuit in the connection target component 60, through the terminal connection structure described in the above embodiment.

For example, a part of the plurality of second wires 42 and the third wire 242 can be connected by connecting a terminal connected to an end portion of the part of the plurality of second wires 42 and a terminal connected to an end portion of the third wire 242, through a short-circuit bus bar 244 in the connection destination connector 256. For example, the short-circuit bus bar 244 can be formed by pressing a metal sheet into a shape including a terminal structure connectable to respective terminals, for example. The short-circuit bus bar 244 may be a bus bar that is inserted into a mold of the connection destination connector 256, or may be a bus bar to be set after molding and after attachment of a terminal.

According to this modification, a part of the plurality of second wires 42 can be connected to the third wire 242 to cause a branch so as to be connected to another connection target component 160, without causing a branch in an intermediate part of the non-water shut-off cable 240.

Figure 8:
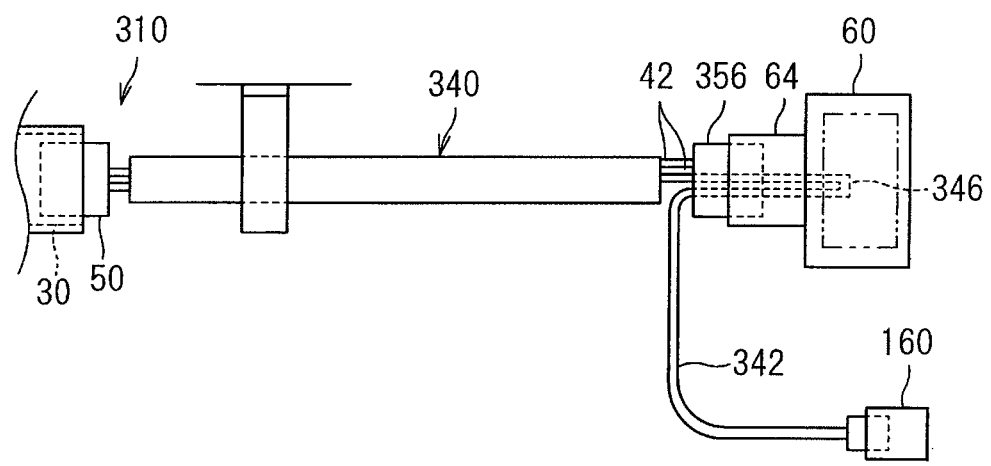
FIG. 8 is a schematic diagram illustrating a wire harness according to yet another modification.
Figure 9:
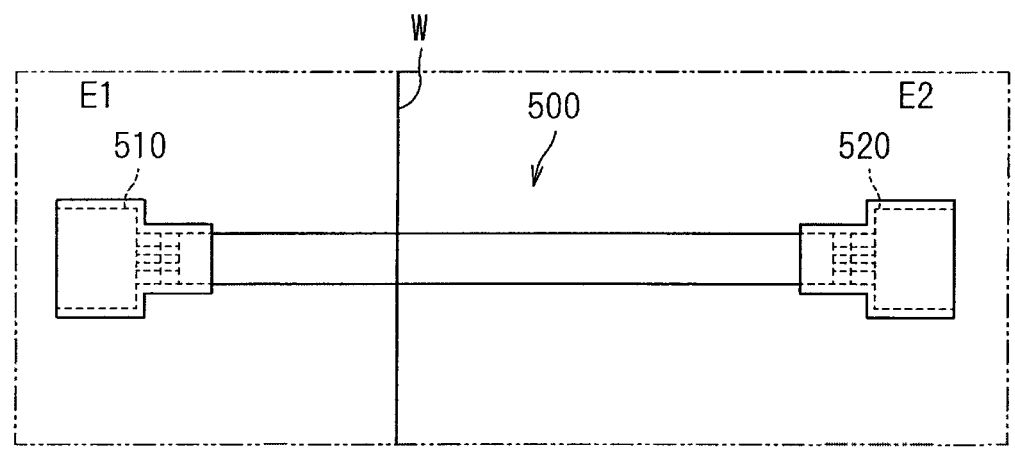
FIG. 9 is a diagram illustrating an example in which a wire harness provided with an inter-wire water shut-off structure is disposed across an interior area and an exterior area.

FIG. 8 is a schematic diagram illustrating a wire harness 310 according to a modification. In the wire harness 310, a non-water shut-off cable 340 further includes a third wire 342 that is electrically connected to a part of the plurality of second wires 42 at a position of the connection target component 60, and that extends from a connection destination connector 356 being an equivalent of the connection destination connector 56 to be connected to another connection target component 160 disposed in the exterior area E2 side.

Specifically, the plurality of second wires 42 are led into the connection destination connector 356. One end portion of at least one third wire 342 is also disposed in the connection destination connector 356. A part of the plurality of second wires 42 is connected to the third wire 342 in the connection destination connector 60. The rest of the plurality of second wires 42 is connected to an electrical circuit in the connection target component 60, through the terminal connection structure described in the above embodiment.

A part of the plurality of second wires 42 and the third wire 342 can be connected in the receiver connector 64 or an internal circuit (e.g., a circuit formed on an internal mounted board) of the connection target component 60.

If a part of the plurality of second wires 42 and the third wire 342 are connected in the receiver connector 64 of the connection target component 60, a component having a configuration similar to the configuration of the short-circuit bus bar 244 is incorporated into the receiver connector 64 in the receiver connector 64, and a terminal of the part of the plurality of second wires 42 and a terminal of the third wire 342 may be connected through connection between the connection destination connector 356 and the receiver connector 64.

If a part of the plurality of second wires 42 and the third wire 342 are connected in an internal circuit of the connection target component 60, the plurality of second wires 42 and the third wire 342 may be connected to an electrical circuit in the connection target component 60 through the terminal connection structure described in the above embodiment, and the electrical circuit may include a circuit 346 for causing the plurality of second wires 42 and the third wire 342 to be short-circuited. According to this configuration, the plurality of second wires 42 are connected to the third wire 342 through the short circuit 346 in the connection target component 60. The third wire 342 is led out to the outside through a base end portion of the connection destination connector 356, and another connection target component 160 is connected to a tip end portion thereof. Note that the rest of the plurality of second wires 42 is connected to an electrical circuit in the connection target component 60.

According to this configuration, a part of the plurality of second wires 42 can be caused to branch as the third wire 342 so as to be connected to another connection target component 160, without causing a branch in an intermediate part of the non-water shut-off cable 340.

Note that each configuration described in the embodiment and each modification described above can be appropriately combined on the condition of being consistent with each other. For example, the branch wire 142 of the modification illustrated in FIG. 6 and the third wire 242 or 342 according to the modification of FIG. 7 or FIG. 8 may be used together in combination.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

10, 110, 210, 310 Wire harness
20 Water shut-off cable
20V Bendable part
22 First wire
24 Sheath
26 Inter-wire water shut-off unit
27 Plug member
28 Cover
30 First joint connector
36 Connector water shut-off plug
40, 140, 240, 340 Non-water shut-off cable
42 Second wire
44, 144 Protective coating
50 Second joint connector
56, 256, 356 Connection destination connector
59 Connector water shut-off plug
60, 160 Connection target component
64 Receiver connector
70 Panel
72 Through hole
80 Grommet
142 Branch wire
242, 342 Third wire
244 Bus bar
346 Short circuit
E1 Interior area
E2 Exterior area

The invention claimed is:

1. A wire harness being disposed across an interior area and an exterior area and being connected to a connection target component in the exterior area, the wire harness comprising:
a water shut-off cable being disposed across a boundary between the interior area and the exterior area, and having inter-wire water shut-off property; and
a non-water shut-off cable being connected to the water shut-off cable in the exterior area, and being connectable to the connection target component.

2. The wire harness according to claim 1, wherein
the water shut-off cable includes
a plurality of first wires,
a sheath surrounding the plurality of first wires, and
an inter-wire water shut-off unit configured to shut off water between the plurality of first wires, at an end portion of the sheath to be connected to the non-water shut-off cable,
a first joint connector is provided at an end portion of the water shut-off cable to be connected to the non-water shut-off cable,
the non-water shut-off cable includes a plurality of second wires collected together in a linear shape with gaps formed between end portions, and
a second joint connector is provided at an end portion of the non-water shut-off cable to be connected to the water shut-off cable, and a connection destination connector is provided at an end portion of the non-water shut-off cable to be connected to the connection target component.

3. The wire harness according to claim 2, wherein
in the connection destination connector, a connector water shut-off unit is provided, the connector water shut-off unit being configured to prevent water flowing along the plurality of second wires from entering the connection destination connector, at a portion where the plurality of second wires are led to the connection destination connector.

4. The wire harness according to claim 2, wherein
the non-water shut-off cable includes a branch wire branching in an intermediate part of the plurality of second wires in an extending direction.

5. The wire harness according to claim 2, further comprising
a third wire being electrically connected to a part of the plurality of second wires at a position of a connection destination connector of the non-water shut-off cable or at a position of the connection target component, and being extending from the connection destination connector to be connected to another connection target component in the exterior area.

6. The wire harness according to claim 1, wherein
in an intermediate part of the water shut-off cable, a grommet to be disposed at a through hole formed in a panel dividing the interior area and the exterior area is attached.

7. The wire harness according to claim 1, wherein
the water shut-off cable includes a bendable part that can be disposed in a bent state in the exterior area.

* * * * *